United States Patent [19]
Williams

[11] Patent Number: 5,887,663
[45] Date of Patent: Mar. 30, 1999

[54] MARKER-ACTUATED IMPLEMENT CONTROL CIRCUIT FOR AN AGRICULTURAL MACHINE

[75] Inventor: Timothy D. Williams, Hinsdale, Ill.

[73] Assignee: Case Corporation, Racine, Wis.

[21] Appl. No.: 800,467

[22] Filed: Feb. 14, 1997

[51] Int. Cl.$^6$ .................................................. A01B 17/00
[52] U.S. Cl. ............................ 172/127; 172/128; 172/2; 111/25; 111/33
[58] Field of Search ................................ 172/2, 311, 127, 172/126, 128, 129, 130, 131, 132, 4, 7, 9; 318/280, 290, 739; 361/167, 195; 701/50; 171/6; 111/25, 33

[56] References Cited

U.S. PATENT DOCUMENTS

| 3,670,823 | 6/1972 | Matthews et al. ...................... 172/128 |
| 3,903,970 | 9/1975 | Grataloup ................................. 172/2 X |
| 4,067,394 | 1/1978 | Deckler ................................ 172/130 X |
| 4,365,672 | 12/1982 | Robinson, Jr. et al. ..................... 172/2 |
| 4,381,036 | 4/1983 | Fardal et al. ................................. 172/2 |
| 4,582,143 | 4/1986 | Pratt ......................................... 172/311 |
| 4,744,285 | 5/1988 | Presley ..................................... 172/2 X |
| 5,113,956 | 5/1992 | Friesen et al. ........................... 172/311 |
| 5,232,054 | 8/1993 | Van Blaricon et al. ................. 172/311 |
| 5,253,717 | 10/1993 | Roush et al. ............................. 172/311 |
| 5,484,025 | 1/1996 | Landphair et al. ...................... 172/311 |
| 5,558,163 | 9/1996 | Hollstein ..................................... 172/2 |

Primary Examiner—Victor Batson
Attorney, Agent, or Firm—Jansson, Shupe, Bridge & Munger, Ltd.

[57] ABSTRACT

Disclosed is a method for controlling the above-ground "raise height" of a seed-planting row unit on an agricultural planter having a row marker, a marker switch and a positioning assembly such as a solenoid valve and hydraulic cylinder for raising and lowering the row unit. The method includes enabling the positioning assembly to raise the row unit and changing the marker switch from its first to its second position when the row unit reaches a predetermined height. The positioning assembly is thereby disabled. Such assembly is re-enabled after a brief time delay. The method is carried out using a unique implement control circuit connected to the marker switch and the positioning assembly.

18 Claims, 3 Drawing Sheets

MARKER-ACTUATED IMPLEMENT CONTROL CIRCUIT FOR AN AGRICULTURAL MACHINE

FIELD OF THE INVENTION

This invention relates generally to earthworking and, more particularly, to agricultural machines having tool-lift actuators.

BACKGROUND OF THE INVENTION

Agricultural machines such as planters, cultivators, fertilizing machines and the like, are used to till fields or to deposit seeds, fertilizer or the like on such fields. To obtain the best result (i.e., even planting, cultivating, or fertilizing), it is preferred that the rows be properly spaced, neither too close nor too far apart.

And it is also preferred that the task be performed as quickly and efficiently as possible without over-cultivating or wasting seed or fertilizer while yet obtaining complete coverage of the field area under cultivation. In other words, efficient machine utilization involves both row spacing and proper manipulation of the operative implement, i.e, the side-by-side seed-planting row units, cultivating discs and harrows or fertilizer hoppers, as examples.

(Machine efficiency is no trivial matter. Modern agricultural machines involve substantial acquisition costs—such machines should be used in a way that maximizes the return on the investment.)

As to row spacing, multi-row machines are configured to perform their tasks in rows which are equally spaced from one another. That is, the operative implements are properly spaced from one another along an axis perpendicular to the direction of travel. Multiple-row agricultural machines are disclosed in U.S. Pat. Nos. 4,582,143 (Pratt), 5,113,956 (Friesen et al.), 5,232,054 (Van Blaricon et al.) and 5,253,717 (Roush et al.).

When using the machine to make multiple passes over a field (as is usually the case), it is also important that an outer row made during a successive pass is properly spaced from the outer row made during the previous pass. That is, the back-and-forth paths of the machine should be properly spaced from one another.

Commonly, this is accomplished by using a marker device which extends laterally from the machine, engages the ground on the "unworked" side of the machine and makes a furrow or other visible "mark" on the ground. This mark establishes a line along which the machine operator steers the machine or the tractor towing the machine.

An agricultural machine having a row marker is disclosed in U.S. Pat. No. 5,484,025 (Landphair et al.). Such patent is assigned to Case Corporation, a leading manufacturer of agricultural machines and the assignee of the invention which is the subject of this specification.

As to the operative implement, the row units, cultivating discs and harrows or fertilizer hoppers must be controlled and manipulated in such a way that the entire area under cultivation is covered with seeds, for example. At the same time, the user wishes to avoid dropping seeds in the non-cultivated ends or side edges of a field since seeds are thereby wasted.

And, often, the operative implement must be raised while preparing to U-turn at the end of a pass. Raising the implement temporarily halts operation of the implement and/or avoids damaging the implement by striking it against the uncultivated area being turned upon.

As an example of the former, the seed-dispensing components of row units are often ground driven by a wheel engaging the ground and mechanically coupled to the components. The only way to temporarily prevent the row units from depositing seed is to stop the tractor (not an acceptable option) or raise the row units.

It will now be appreciated that to raise the implement, make a U-turn at the end of the field and again lower the implement to its operative position takes valuable time. The invention reduces such time in a unique way.

In known agricultural machines, the operator actuates a lever or the like to raise or lower the implement. Once implement movement is initiated, it continues automatically until the implement reaches its maximum height above the ground. This automatic operation is very convenient because when preparing to turn, the operator must also attend to other tasks.

And another convenient feature used on known machines involves marker control. A planter, for example, has a marker switch controlling each of two solenoid valves associated with respective markers. When a marker valve is energized, a hydraulic path is opened from a tractor valve to the marker cylinder. When the tractor valve is moved to the "raise" position (to raise the implement), that marker, the solenoid of which is then energized through the marker switch, is also raised. That is, its hydraulic cylinder in then in parallel with the hydraulic cylinder raising the implement.

To put it in different words, operation of the marker switch causes the appropriate marker to be extended and the other marker to retract. The height of the switch above ground is adjustable over a range of several inches. However, marker switch position only affects that implement height at which such implement operates the switch and has no bearing upon the height to which the implement itself is ultimately raised.

With machines such as describes above, the resulting maximum implement height above the ground is often well in excess of that needed to achieve the above-described result of avoiding striking uncultivated dirt or temporarily halting implement operation. And, clearly, the time required to bring the implement to maximum height affects the overall "cycle time" and, consequently, the productivity of the machine.

A new circuit and method which improve machine efficiency and reduce overall cycle time would be an important advance in the art.

OBJECT OF THE INVENTION

An object of the invention is to provide an implement control circuit and related method which overcome some of the problems and shortcomings of the prior art.

Another object of the invention is to provide an implement control circuit and related method which permit an agricultural machine operator to raise a machine implement to a selected height less than the maximum attainable height above ground level.

Another object of the invention is to provide an implement control circuit and related method which retain the automatic operating features relating to marker control and implement raising.

Still another object of the invention is to provide an implement control circuit and related method which improve machine efficiency.

Another object of the invention is to provide an implement control circuit and related method which permit an agricultural machine operator to make more rapid turns between machine passes over a field.

Another object of the invention is to provide an implement control circuit and related method which reduce machine cycle time. How these and other objects are accomplished will become apparent from the following descriptions and from the drawings.

SUMMARY OF THE INVENTION

The invention involves a marker circuit for controlling a marker on an agricultural machine, e.g., a planter, having an implement moved by a positioning assembly. In a specific embodiment, the implement is a row unit (a mechanism for planting seeds) and the positioning assembly includes a solenoid valve and a hydraulic cylinder for raising and lowering the row unit. The marker circuit includes a marker switch having a first position and a second position.

In one aspect of the invention, the improvement comprises an implement control circuit connected to the marker switch. Briefly described, such control circuit immediately disables the solenoid valve and hydraulic cylinder when the row unit is raised to a height sufficient to trip the marker switch. After a time delay of, e.g., 2 or 3 seconds, the control circuit re-enables the solenoid valve and hydraulic cylinder so that the row unit may be further raised for extra ground clearance or to transport the machine.

The control circuit includes a positioning assembly control device, e.g., an electromagnetic relay, having an open state and a closed state. The positioning assembly is actuated when the marker switch is in the first position. And when the marker switch is moved from the first position to the second position, the control device changes from the closed state to the open state, thereby disabling the positioning assembly.

In a more specific aspect of the invention, the control device is electrically powered and the implement control circuit includes a transistor section connected between the marker switch and the control device and also includes a trigger circuit connected between the marker switch and the transistor section. The transistor section and the trigger coact to change the control device from the closed state to the open state.

The implement control circuit also has a time-delay circuit connected between the marker switch and the transistor section. After a time delay, such time-delay circuit changes the control device from the open state back to the closed state so that the row unit may be lowered.

The implement control circuit also includes an input switching device, e.g., an electromechanical relay, having first and second switching states such as open and closed, respectively. When the marker switch is moved from the first position to the second position as the implement reaches a predetermined height, the switching device changes from an open state to a closed state. The time-delay circuit has a resistor-capacitor timing network and when the switching device changes from an open state to a closed state, the capacitor charges.

Another aspect of the invention involves a method for controlling the implement. Such method includes the steps of actuating the positioning assembly, changing the marker switch from the first position to the second position, disabling the positioning assembly and then re-enabling the positioning assembly.

In more specific aspects, the enabling step is followed by the step of raising the implement and the changing step occurs when the implement is raised to a predetermined height above the field. The positioning assembly is connected in series with the positioning assembly control device and the disabling step includes changing the state of the control device from, e.g., closed to open. Similarly, the re-enabling step includes changing the state of the control device from, e.g., open to closed. In a highly preferred method, a predetermined period of time lapses between the disabling step and the re-enabling step.

In other, more specific aspects of the method, the input switching device has first and second switching states (e.g., open and closed) and the changing step includes changing the switching state of the input switching device. Most preferably, changing the state of the control device is preceded by changing the switching state of the input switching device.

Other aspects of the invention are set forth in the following detailed description and in the drawings.

DETAILED DESCRIPTIONS OF PREFERRED EMBODIMENTS

Figure 1:
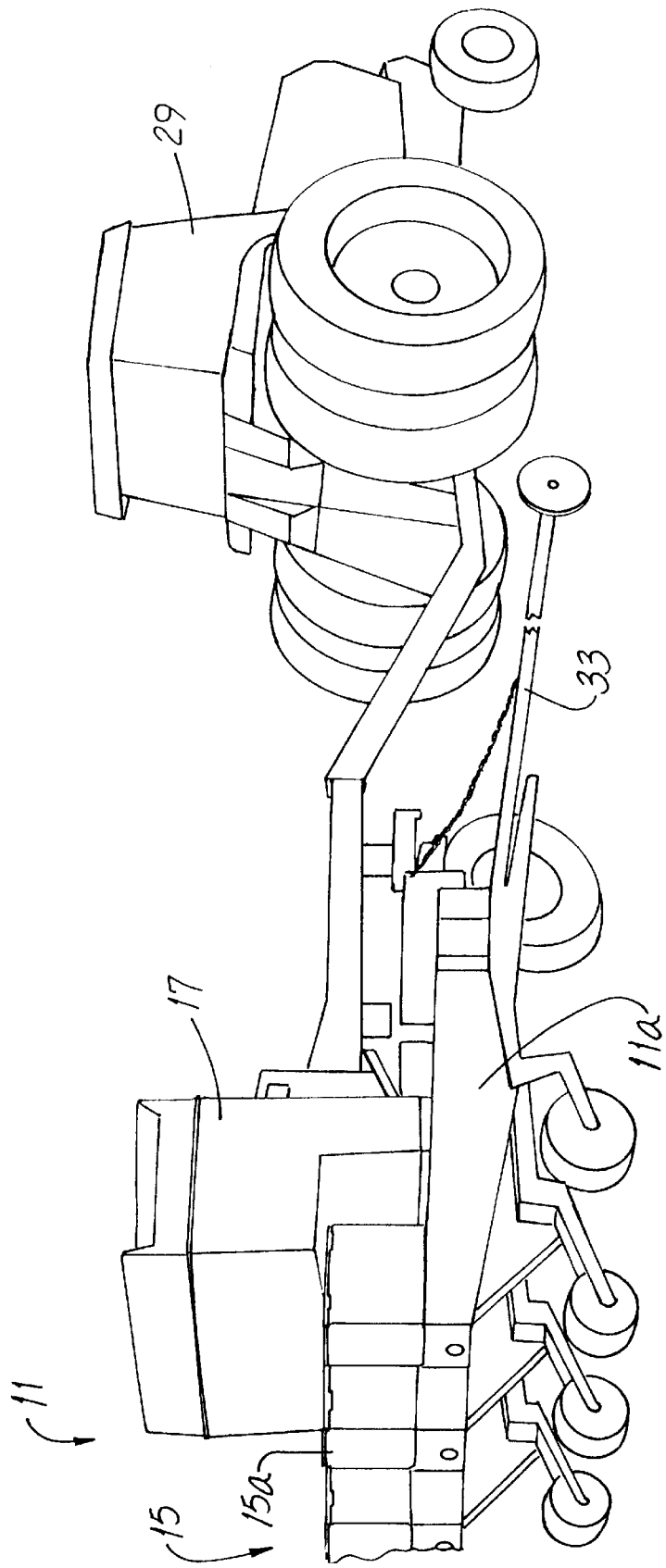
FIG. 1 is a representative perspective view of an exemplary agricultural machine embodied as a multi-row planter. Such planter is drawn by a tractor. Parts are broken away.
Figure 2:
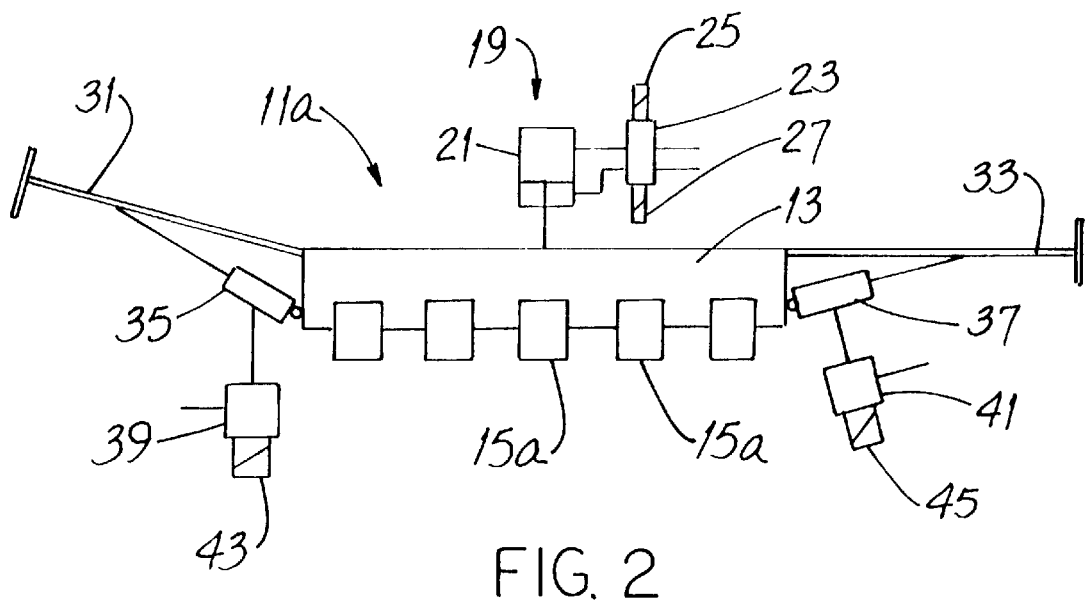
FIG. 2 is a representative elevation view of the planter shown in FIG. 1.

Before describing the inventive circuit 10 and method, it will be helpful to have an understanding of a type of agricultural machine 11 and its operative implement 13 with which such circuit 10 and method may be used. Referring to FIGS. 1 and 2, a machine 11 embodied as a multi-row planter 11a has a tool bar 13 on which are mounted operative implements embodied as row units 15a. ("Row unit" is a common name for a mechanism that accepts seeds from a hopper 17 and deposits such seeds in a furrow.)

The tool bar 13 and the row units 15a are raised or lowered by a positioning assembly 19 comprising a hydraulic cylinder 21 and valve 23, the latter actuated by two solenoids 25, 27, respectively. Energization of the solenoid 27 causes the tool bar 13 to raise while energization of the solenoid 25 causes the tool bar 13 to lower. When neither solenoid 25 or 27 is energized, the tool bar 13 is maintained at a fixed elevation. Energization of the solenoid 25 or of the solenoid 27 is by manually manipulating a control mechanism (not shown) on the tractor 29.

The planter 11a (drawn through the field in a direction away from the viewer of FIG. 2) also has left and right markers 31 and 33, respectively. The markers 31, 33 are alternately raised and lowered by hydraulic cylinders 35 and 37, respectively, and valves 39 and 41, respectively. Such valves 39, 41 are actuated by solenoids 43 and 45, respectively.

The hydraulic circuit associated with such cylinders 35, 37 and valves 39, 41 is arranged in such a way that when a solenoid 43 or 45 is energized, the related marker 31 or 33 is raised. And when such solenoid 43 or 45 is de-energized, the related marker 31 or 33 lowers under force of gravity. (It is to be appreciated that there are a number of ways to mount and position the operative implement 15, e.g., a row unit tool bar 13, or a marker 31, 33 on an agricultural machine 11. The foregoing is merely representative to gain a fuller appreciation of the invention.)

Figure 3A:
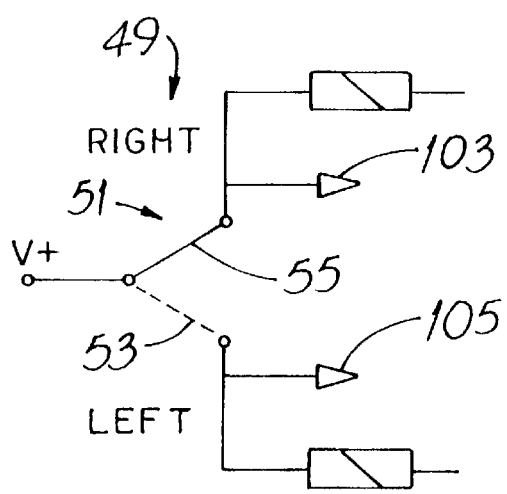
FIG. 3A is a simplified schematic diagram of a marker circuit.
Figure 3B:
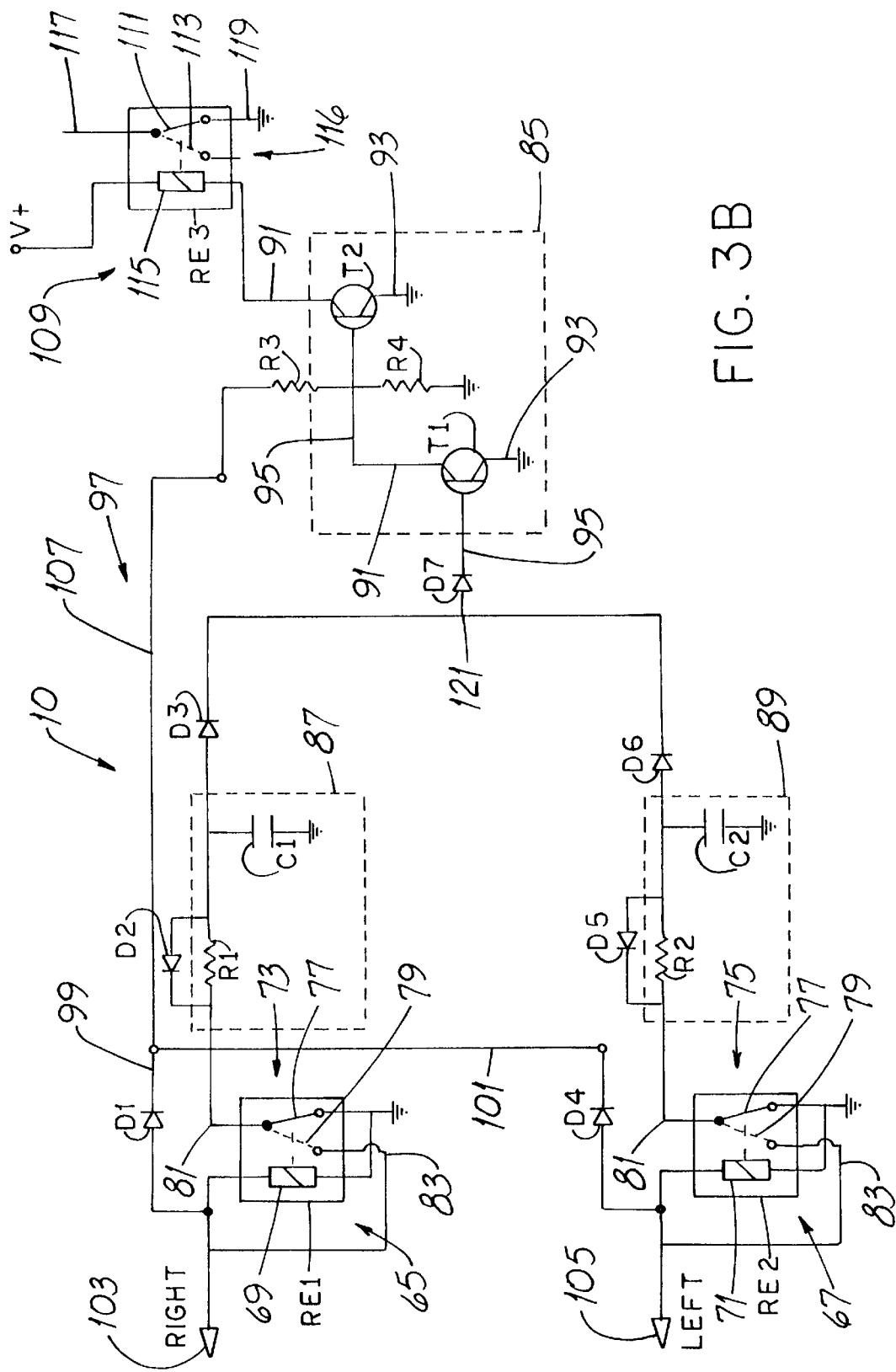
FIG. 3B is a schematic diagram of the inventive implement control circuit. The arrowheads at RIGHT, LEFT in FIGS. 3A and 3B constitute the points of connection for the marker circuit and the control circuit.

Referring also to FIGS. 3A and 3B, a marker circuit 49 includes a marker switch 51 having a first position 53 represented by the dashed line and a second position 55 represented by the solid line. When the switch 51 is in the first position 53, the left marker 31 is raised and the right marker 33 is lowered. And when such switch 51 is in the second position 55, the right marker 33 is raised and the left marker 31 is lowered. For a particular type of marker switch 51, the time required for the switch 51 to "transition" from one position to the other is on the order of 10 milliseconds. And the marker switch 51 is of the type that toggles only when contacted by the tool bar 13 moving in the upward direction.

Figure 4:
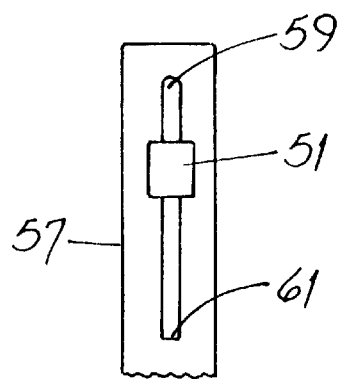
FIG. 4 is a representative elevation view of a marker switch adjustable in vertical position on a support. Parts are broken away.

As shown in FIG. 4, the marker switch 51 is mounted on a support 57. The vertical location of such switch 51 is adjustable between maximum height at the location 59 and minimum height at the location 61. The foregoing information relating to the machine 11, planters 11a, markers 31, 33, marker circuit 49 and adjustability of the height of the marker switch 51 are known.

The Inventive Implement Control Circuit and Method

Construction details of the implement control circuit 10 are described below. Such description is followed by an explanation of how the circuit 10 operates in conjunction with the marker circuit 49.

The implement control circuit 10 has first and second input switching devices 65, 67, respectively, which are embodied as electromagnetic relays RE1, RE2, respectively. Each relay RE1, RE2 has a solenoid 69, 71, respectively, controlling a switch 73, 75, respectively, which is in the first switching state 77, e.g., open or grounded as shown in FIG. 3B) and moves to the second or closed switching state 79 (as represented by the dashed line) when the solenoid 69 or 71 is energized. The switch 73 or 75 is said to be closed when it establishes a connection between points 81 and 83. (When connected as shown and operated as described, the relays RE1 and RE2 are referred to as "normally open" relays because the path from point 81 to point 83 is open unless the solenoid 69 or 71 is energized.)

The implement control circuit 10 also has a transistor section 85 and first and second time delay circuits 87 and 89, respectively. Each such circuit 87, 89 is connected between the marker switch 51 and the transistor section 85. Each time delay circuit 87 or 89 includes a resistor R1 or R2 and a capacitor C1 or C2 and the time required to charge the capacitor C1 or C2 provides the 2 to 3 second time delay mentioned below.

The transistors T1, T2 used in the transistor section 85 are of the type that do not conduct current from point 91 to point 93 unless a voltage is applied at the point 95. And when a voltage is applied at a point 95, that transistor T1 or T2 changes to a conducting or short-circuit state and conducts current from point 91 to point 93.

A trigger circuit 97 is connected between the marker switch 51 and the transistor section 85 and includes first and second legs 99, 101, respectively, which are connected to the input terminals 103, 105, respectively. The legs 99, 101 join to a common leg 107 which is used to control the transistor section 85 as described below.

The circuit 10 also has a positioning assembly control device 109 embodied as an electromagnetic relay RE3. As the name suggests, the device 109 controls the positioning assembly 19 shown in FIG. 2.

The relay RE3 can be in a first or closed switching state 111 as shown in FIG. 3B or, when the solenoid 115 is energized, in a second, open switching state 113 as represented by the dashed line. The relay RE3 is said to be closed when it establishes a connection between points 117 and 119. (When connected as shown and operated as described, the relay RE3 is referred to as a "normally closed" relay because the path from point 117 to point 119 is closed unless the solenoid 115 is energized.)

When the relay RE3 is in its closed state 111 as shown in FIG. 3B, the solenoid 27 (FIG. 2) may be energized to permit hydraulic fluid flow to the cylinder 21, raising the tool bar 13. And when the relay RE3 is in its open state 113 as represented by the dashed line in FIG. 3B, the solenoid 27 is prevented from being energized and hydraulic fluid is prevented from flowing to the cylinder 21 and raising the tool bar 13. However, the solenoid 25 may be energized to lower the tool bar 13. As described below, the relay RE3 is instantaneously opened when the tool bar 13 trips the marker switch 51, the height of which is adjustable. Thus, the tool bar 13 may be prevented from attaining its maximum height above ground level.

As will become more apparent, the circuit 10 uses "logic inversion" in its operation. For example, when the relay RE1 is open between points 81 and 83 as in FIG. 3B, the relay RE3 is closed between points 117 and 119. And when the relay RE1 is switched to its closed state 79, the relay RE3 opens for a short period of time.

Operation

Referring to the FIGURES, and particularly to FIGS. 2, 3A, 3B, it is assumed that the machine 11 is approaching the end of a row and that the operator wishes to raise the implement 15 in preparation for a U-turn to the right. It is also assumed that the marker switch 51 in its first position 53 and when the switch 51 is in such position 53, the left marker 31 is raised and the right marker 33 is lowered and has been marking a furrow to be followed after the U-turn is completed.

The operator actuates the control to raise the implement 15 and in so doing, the solenoid 27 is energized for implement raising. After the implement 15 rises to a predetermined height (as set by the location of the marker switch 51), the switch 51 toggles and switches to the second position 55. When the marker switch toggles, two events occur. One is that a voltage is applied to the leg 99, to the common leg 107 and thence to the point 95 of the transistor section 85. Voltage applied to the point 95 causes the transistor T2 to switch to a conducting state and energize the solenoid 115 of the positioning assembly control device 109.

The switch 116 of the device 109 (such switch 116 being in series with the solenoid 27 of the assembly 19) is thereby changed from the closed state 111 (represented by the solid line) to the open state 113 as represented by the dashed line. As a consequence, the tool bar 13 and row units 15a stop upward movement at a height set by the position of the marker switch 51 on the support 57. (It is to be appreciated that since the switch 51 does not affect the solenoid 25, the tool bar 13 and row units 15a are free to be lowered under control of the operator.)

The other event which occurs when the marker switch 51 toggles is that the solenoid 69 of the first input switching device RE1 is energized. This causes the switch 73 to change from the open state 77 as represented by the solid line to the closed state 79 as represented by the dashed line. (It is to be appreciated that when the switch is in what is described above as the open state, this means that such switch is disconnected from the voltage on the line.)

With the switch 73 in the closed state, voltage is applied to the time-delay circuit 87 and the capacitor C1 starts to charge. As the capacitor C1 charges to an increasingly-high voltage, the voltage at the point 121 "follows" the capacitor voltage and at a sufficiently-high capacitor voltage, the transistor T1 is switched to a conducting state and connects the point 95 to ground point 93. In a highly preferred embodiment, the resistor R1 and capacitor C1 are selected to switch transistor T1 to a conducting state after a time delay of about 2 to 3 seconds.

When the transistor T1 is switched to a conducting state, T2 changes to a non-conducting state, the solenoid 115 is de-energized and the switch 116 returns to its closed state 111 as represented by the solid line. And since electrical continuity to the solenoid 27 is now restored, the machine operator can cause the implement 15 to be lifted higher by manually manipulating the proper control mechanism mentioned above.

To summarize operation, toggling the marker switch 51 causes the implement "raise" solenoid 27 to immediately be disabled for 2 to 3 seconds. After the lapse of such time, electrical continuity to the solenoid 27 is restored and the implement 15 can be further lifted to obtain additional ground clearance or, if a folding planter 11a is involved, to fold the planter 11a for transporting.

The following components have been found useful in making the new circuit 10:

| | |
|---|---|
| D1–D7 | 1N4004 |
| T1, T2 | 2N6038 |
| C1, C2 | 300μ |
| RE1, RE2 | SPDT 12v 2 Amp Max PC Mount |
| R1, R2 | 56 Kohm |
| R3 | 5.1 Kohm |
| R4 | 5.6 Kohm |

While the principles of the invention have been shown and described in connection with specific embodiments, it is to be understood clearly that such embodiments are by way of example and are not limiting.

What is claimed:

1. In a marker circuit for controlling a marker on an agricultural machine having an implement moved by a positioning assembly, the marker circuit including a marker switch having a first position and a second position, the improvement comprising:

an implement control circuit connected to the marker switch, the implement control circuit including a positioning assembly control device having an open state and a closed state;

and wherein:

the positioning assembly is actuated when the marker switch is in the first position;

when the marker switch is moved from the first position to the second position, the positioning assembly control device changes from the closed state to the open state, thereby disabling the positioning assembly.

2. The marker circuit of claim 1 wherein the positioning assembly control device is electrically powered and the implement control circuit includes:

a transistor section connected between the marker switch and the positioning assembly control device; and a trigger circuit connected between the marker switch and the transistor section for changing the positioning assembly control device from the closed state to the open state.

3. The marker circuit of claim 2 including a time-delay circuit connected between the marker switch and the transistor section for changing the positioning assembly control device from the open state to the closed state after a time delay.

4. The marker circuit of claim 1 including an input switching device having an open state and a closed state and wherein:

when the marker switch is moved from the first position to the second position, the switching device changes from the input switching device open state to the input switching device closed state.

5. The marker circuit of claim 4 including a time-delay circuit, having a resistor and a capacitor connected between the marker switch and the positioning assembly control device and wherein:

when the switching device changes from the input switching device open state to the input switching device closed state, the capacitor charges.

6. The marker circuit of claim 1 wherein the machine is a planter and the implement is a seed-planting row unit.

7. A method for controlling an implement on an agricultural machine having (a) a row marker, (b) a marker switch having a first position and a second position, and (c) a positioning assembly for moving the implement, the method including the steps of:

enabling the positioning assembly to raise the implement;

changing the marker switch from the first position to the second position when the implement raises to a preselected height;

disabling the positioning assembly in response to the step of changing the marker switch; and re-enabling the positioning assembly.

8. The method of claim 7 wherein the enabling step is followed by the step of raising the implement.

9. The method of claim 8 wherein the machine is in a field and wherein:

the enabling step is preceded by a step of mounting the marker switch at a location; and the changing step occurs when, as a function of the location of the marker switch, the implement is raised to a predetermined height above the field.

10. The method of claim 7 wherein:

the positioning assembly is connected in series with a positioning assembly control device having a first state and a second state; and the disabling step includes changing the state of the positioning assembly control device.

11. The method of claim 7 wherein:

the positioning assembly is connected in series with a positioning assembly control device having a first state and a second state; and the re-enabling step includes changing the state of the positioning assembly control device.

12. The method of claim 11 wherein the disabling step includes changing the state of the positioning assembly control device.

13. The method of claim 7 wherein a predetermined period of time lapses between the disabling step and the re-enabling step.

14. The method of claim 7 carried out using an implement control circuit connected to the marker switch and having an input switching device having first and second switching states and wherein the changing step includes changing the switching state of the input switching device.

15. The method of claim 14 wherein:
the implement control circuit includes a positioning assembly control device having a closed state and an open state;
the disabling and re-enabling steps are carried out by changing the state of the positioning assembly control device.

16. The method of claim 15 wherein the disabling step is carried out by changing the state of the positioning assembly control device from the closed state to the open state.

17. The method of claim 16 wherein the re-enabling step is carried out by changing the state of the positioning assembly control device from the open state to the closed state.

18. The method of claim 16 wherein changing the state of the positioning assembly control device is preceded by the said changing the switching state of the input switching device.

* * * * *